United States Patent
Van Der Schaar-Mitrea

(12) 
(10) Patent No.: US 6,553,146 B1
(45) Date of Patent: Apr. 22, 2003

(54) METHOD AND ARRANGEMENT FOR ENCODING VIDEO IMAGES

(75) Inventor: Mihaela Van Der Schaar-Mitrea, Ossining, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/488,029

(22) Filed: Jan. 20, 2000

(30) Foreign Application Priority Data

Jan. 21, 1999 (EP) .............................. 99200158

(51) Int. Cl.$^7$ ................................. G06K 9/36

(52) U.S. Cl. ...................... 382/239; 382/236; 382/251; 375/240

(58) Field of Search ................................. 382/239, 251, 382/236, 232; 386/109, 112; 375/240.2, 240.18

(56) References Cited

U.S. PATENT DOCUMENTS

| 5,047,852 A | * | 9/1991 | Hanyu et al. ............. 375/240.2 |
| 5,825,970 A | * | 10/1998 | Kim ........................... 386/109 |
| 6,031,872 A | * | 2/2000 | Han ........................... 375/240 |

FOREIGN PATENT DOCUMENTS

| EP | 0727907 | * | 8/1996 | ............ H04N/7/30 |

* cited by examiner

Primary Examiner—Anh Hong Do
(74) Attorney, Agent, or Firm—Russell Gross

(57) ABSTRACT

When embedded memory compression is used in the recursive loop of a predictive (MPEG) encoder/decoder, a given compression factor must be achieved. To this end, the image is divided in segments, i.e. groups of (macro)blocks. Each segment is feedforward coded using a quantization strategy such that the compression factor is achieved. This leaves spare bits in the (fixed) segment size. In accordance with the invention, the space left unused by segments is used for refining the quantization of segments having a higher than average activity.

4 Claims, 2 Drawing Sheets

US 6,553,146 B1

METHOD AND ARRANGEMENT FOR ENCODING VIDEO IMAGES

FIELD OF THE INVENTION

The invention relates to a method and arrangement for encoding images.

BACKGROUND OF THE INVENTION

Advanced digital compressions systems such as MPEG and H.263 are entering the consumer market. The consumer acceptation of these technologies relies considerably on the possibility of substantially reducing of the implementation costs. One of the important factors is the amount of memory that encoders and decoders need for storing reference frames of the video signal. Low-cost and high-quality memory embedded compression techniques can be designed to reduce said memory capacity. Similar techniques can advantageously be used in other video enhancement circuits in which large amounts of memory are required.

However, the invention is not restricted to memory embedded compression circuits. The invention can also be used for reducing the video bandwidth prior to transmission over a (local) channel having a low capacity.

Most known embedded compression schemes are based on a feed-forward coding mechanism. The principal idea behind feed-forward coding is to compress small sub-images, called segments, into a fixed number of bits. The video data is decorrelated by an orthogonal transform (usually the Discrete Cosine Transform DCT). The DCT-coefficients are to be quantized such that a fixed compression factor is achieved for each segment. To this end, a number of quantization strategies are analyzed, and the strategy is chosen that ensures that the compression factor for each sub-image is closest to the target compression factor but does not exceed it.

OBJECT AND SUMMARY OF THE INVENTION

It is an object of the invention to provide a method and arrangement with which the quality of encoding is improved without exceeding the overall target compression factor. To this end, the method in accordance with the invention comprising the steps of:

dividing each image into a plurality of segments;

encoding segments into variable numbers of bits less than a target bit cost;

counting the number of spare bits of the target bit cost not used for encoding the segments;

enlarging the target bit cost by said number of spare bits for segments if encoding said segments requires a quantization which is coarser than a predetermined quantization.

With the invention is achieved that a variable compression scheme per segment is employed. The spare bits unused by other segments are used to enhance the quality of segments that have a high activity by decreasing the quantization coarseness of said segments. The spare bits are only used if the quantization is coarser than an average quantization. In this way, the quality enhancement of the segments already having a high quality is prevented.

DESCRIPTION OF EMBODIMENTS

Figure 1:
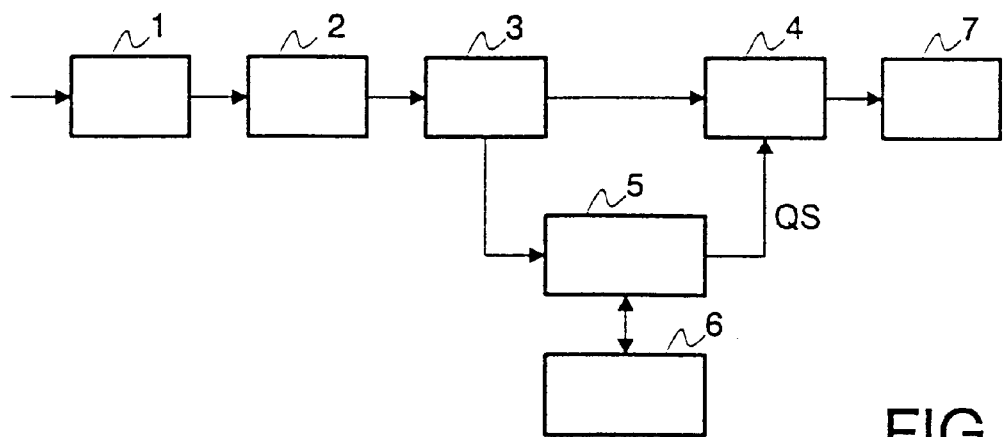
FIG. 1 shows a schematic diagram of an arrangement in accordance with the invention.

FIG. 1 shows a schematic diagram of an arrangement in accordance with the invention. The arrangement comprises a segment construction unit 1. This unit groups sets of 8×8 image blocks into segments to be coded. The segment size depends on the memory than can be spent for embedded compression and determines the overall image quality of the compressed data. The video data of each 8×8 block are decorrelated by a decorrelation unit 2, for example, a discrete cosine transform (DCT) circuit. The DCT coefficient blocks are subsequently applied to a buffer memory 3. A segment analyzer 4 has access to the buffer. The analyzer calculates the bit cost for encoding a segment by employing different quantizer tables stored in a table memory 6, and selects an optimal quantizing strategy. A detailed description of the operation of the analyzer will be given below. The selected quantization strategy is denoted QS and applied to a quantizer 4 which performs the actual quantization of the segment for storage it in an embedded memory or transmission channel 7.

Figure 2:
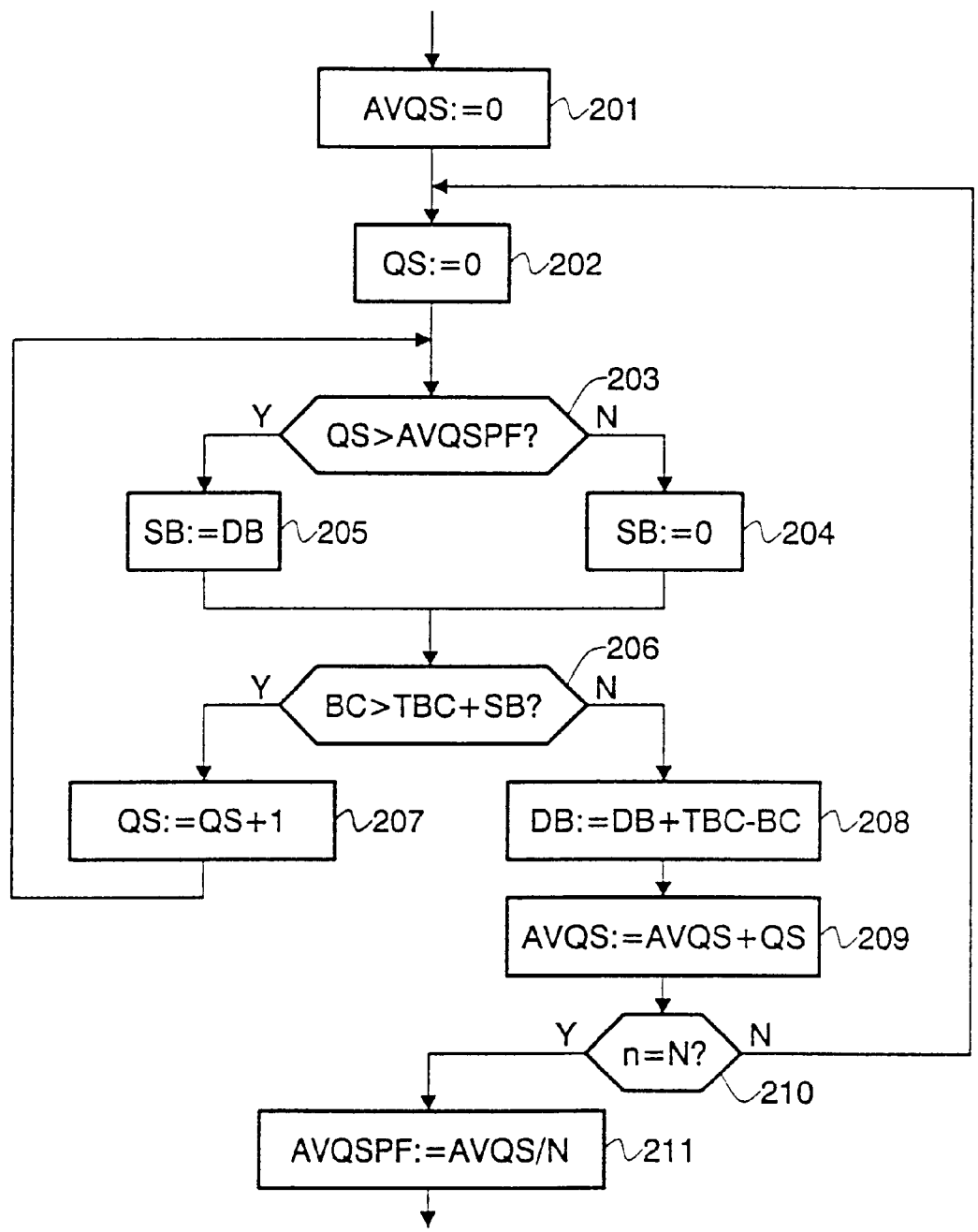
FIG. 2 shows a flow diagram of operational steps performed by a segment analyzer which is shown in FIG. 1.

FIG. 2 shows a flow diagram of steps performed by the segment analyzer 4 for each video frame. In the Figure, a parameter QS denotes a quantization strategy. The quantization strategy QS is represented by an integer number. The higher the number is, the coarser the DCT-coefficients of the segment are quantized. A parameter TBC represents the default target bit cost for each segment. Generally, TBC is the target number of bits for a frame divided by the number of segments. In an initial step 201, a parameter AVQS assumes an initial value zero. This parameter is used to calculate the average quantization strategy applied to the current frame.

The processing of each segment starts with a step 202 in which the quantization strategy QS is initially given the value zero (i.e. the finest quantization), and comprises a loop in which the quantization is coarsened (step 207) until it is found, in a step 206, that the bit cost BC fits within an available number of bits. Said available number of bits is the default target bit cost TBC plus a number of spare bits SB. The loop further includes a step 203 in which the current quantization QS is compared with the average quantization strategy AVQSPF that was applied to the previous frame. As long as the quantization is finer than or equal to said average quantization, a step 204 is performed in which the number of spare bits SB is set to zero. Each encoded segment will thus fit within the default target bit cost TBC, if that can be achieved using a quantization strategy QS which is the same as or finer than the average quantization strategy used in the previous frame. The part of the default target bit cost being left constitutes a series of dummy bits. The cumulative number of dummy bits DB that are gathered in this manner is calculated in a step 208.

Figure 3A:
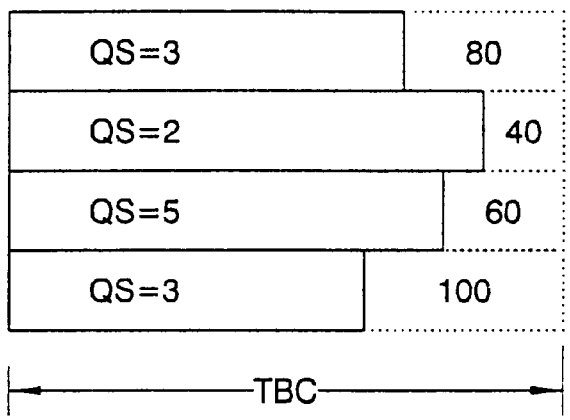
FIGS. 3A and 3B show examples of coding results to illustrate the operation of the segment analyzer which is shown in FIG. 1.

FIG. 3A shows an example of the result of encoding an image when all segments of the image had to be encoded in less bits than the default target bit cost TBC as is done in prior art encoding schemes. The first segment is encoded with QS=3, leaving 80 dummy bits. The second segment is encoded with QS=2, leaving 40 dummy bits. The third segment appears to have a high local image activity. This segment only fits within the default target bit cost TBC if it is quantized with a quantization strategy QS=5 which is considerably coarser than the average quantization used in the previous frame (which is here assumed to be 3).

Figure 3B:
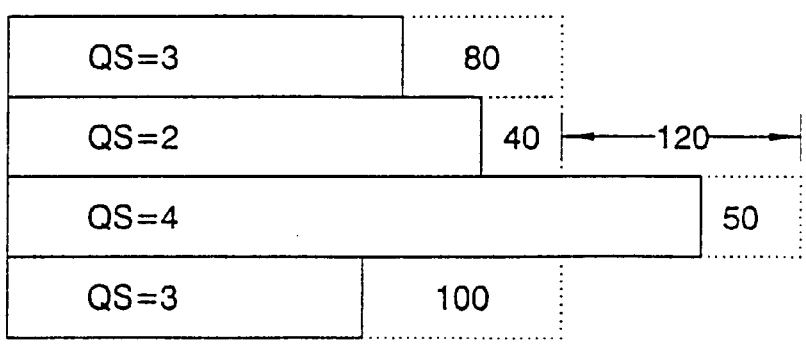

In accordance with the invention, the dummy bits being left after encoding previous segments are used for enlarging the target bit cost if it has been found, in the step 203, that the quantization QS is coarser than the average quantization used in the previous frame. To this end, a step 205 is performed in which the number of spare bits SB assumes the number of dummy bits DB gathered so far. FIG. 3B shows the effect thereof. The target bit cost for encoding the third segment is enlarged by 80+40=120 bits. The segment can now be encoded with QS=4. This value still exceeds the average quantization of the previous frame but is finer than QS=5 in FIG. 3A. The quantization of segments having a high activity is thus effectively refined.

When a segment has been processed, the quantization strategy QS used for encoding the segment is added to AVQS in a step 209. In a step 210, it is checked whether all N segments of the frame have been encoded. If the complete frame has been processed, the average quantization strategy that was applied to the frame is calculated in a step 211 so as to determine the average quantization strategy AVQSPF for the next frame.

The invention can be summarized as follows. When embedded memory compression is used in the recursive loop of a predictive (MPEG) encoder/decoder, a given compression factor must be achieved. To this end, the image is divided in segments, i.e. groups of (macro)blocks. Each segment is feedforward coded using a quantization strategy such that the compression factor is achieved. This leaves spare bits in the (fixed) segment size. In accordance with the invention, the space left unused by segments is used for refining the quantization of segments having a higher than average activity.

What is claimed is:

1. A method of encoding video images, comprising the steps of:

dividing each image into a plurality of segments;

encoding segments into variable numbers of bits (BC) less than a target bit cost (TBC);

counting the number of spare bits (SB) of the target bit cost not used for encoding the segments;

enlarging the target bit cost (TBC) by said number of spare bits (SB) for segments if encoding said segments requires a quantization which is coarser than a predetermined quantization.

2. A method as claimed in claim 1, wherein said predetermined quantization is the average quantization used for encoding a previous video image.

3. A method as claimed in claim 1, wherein said predetermined quantization is the average quantization used for encoding a previous video image.

4. An arrangement for of encoding video images, comprising:

means (1) for dividing each image into a plurality of segments;

means (2,4) for encoding segments into variable numbers of bits (BC) less than a target bit cost (TBC);

means (5) for counting the number of spare bits (SB) of the target bit cost not used for encoding the segments, and enlarging the target bit cost (TBC) by said number of spare bits (SB) for segments if encoding said segments requires a quantization (QS) which is coarser than a predetermined quantization (AVQSPF).

* * * * *